March 18, 1969
J. P. W. HOUTMAN
3,433,053
METHOD AND AN APPARATUS FOR THE RADIO GAS CHROMATOGRAPHIC
ANALYSIS OF A MIXTURE OF DIFFERENT COMPONENTS
Filed Oct. 11, 1965
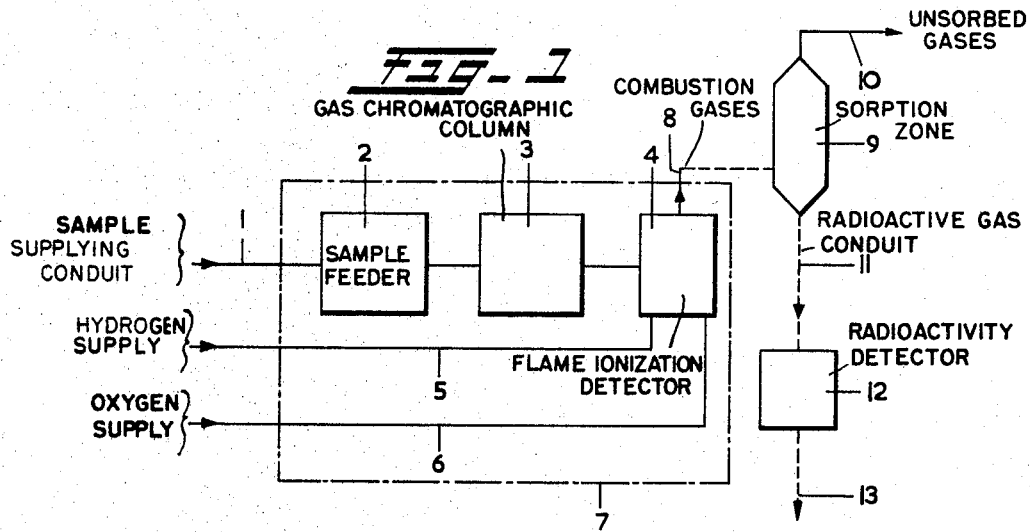
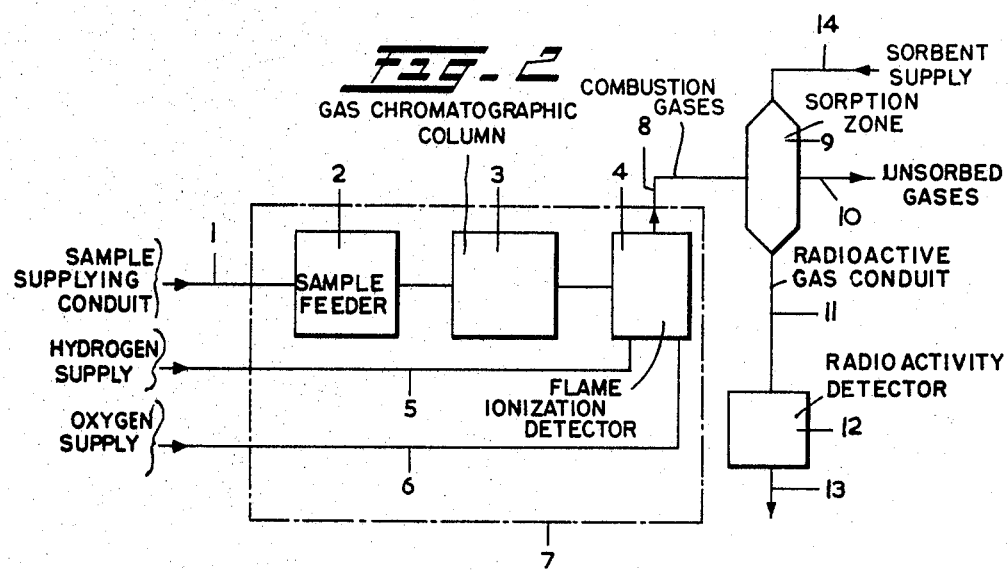
INVENTOR.
Johannes Paulus Willem Houtman.
BY
Mason, Porter, Diller & Brown
ATTORNEYS

United States Patent Office 3,433,053
Patented Mar. 18, 1969

3,433,053
METHOD AND AN APPARATUS FOR THE RADIO GAS CHROMATOGRAPHIC ANALYSIS OF A MIXTURE OF DIFFERENT COMPONENTS
Johannes Paulus Willem Houtman, Delft, Netherlands, assignor to North American Philips Company Inc., New York, N.Y., a corporation of Delaware
Filed Oct. 11, 1965, Ser. No. 494,373
Claims priority, application, Netherlands, Oct. 14, 1964, 6411926
U.S. Cl. 73—23.1        11 Claims
Int. Cl. G01n 31/08

ABSTRACT OF THE DISCLOSURE

A method and apparatus for the radio gas chromatographic analysis of a mixture of different components is disclosed in which the effluent from a gas chromatographic column is passed through and combusted in a flame ionization detector where not only the concentration of the components in the mixture is measured but oxidation products are formed which are passed directly to a radioactivity detector to radioactively analyze those oxidation products.

---

This invention relates to a method for the radio gas chromatographic analysis of a mixture of different components, which comprises oxidizing the gaseous effluent from a gas chromatographic column, and analyzing the oxidation products in a mass detector and in a radio activity detector. Such a method is disclosed in Nucleonics 19, (1961), 45–50.

When this known method is applied for the analysis of a material labeled with a 14C as a tracer, the gaseous products from the gas chromatographic column are passed into a quartz tube packed with copper axide and heated at 750° C., in which they are oxidized to carbon dioxide and water, after which the mixture with the oxidation products is dried over silicagel, and analyzed in a heat conductivity detector and in an ionization chamber. If, in addition to the 14C, the material to be analyzed contains 3H, the effluent from the column is passed into a tube packed with copper oxide and reduced iron which is heated at 725±10° C. so that the organic constituents are converted into a mixture of carbon dioxide and hydrogen, which is separated into its components in a second column, which are then separately measured in the mass and radiation detectors.

For the analysis of very small samples, however, these known methods are insufficiently sensitive. The sensitivity of the mass determination may be increased by using a highly sensitive detector, generally an ionization detector, particularly a flame ionization detector. In the latter, the effluent is passed through a hydrogen flame, and the change in electric conductivity of the gases in the flame is measured. The sensitivity of the ionization detector is $10^3$–$10^4$ times as high as that of the heat conductivity detectors, by virtue of which flame ionization detector often enables measurements of concentrations of the components as low as 1 molecule to $10^9$ molecules of carrier gas. However, since in a flame ionization detector, the combustion products formed are lost in the atmosphere, the gas stream from the column was in the known instruments divided into two partial streams, the stream which does not pass the flame being used for carrying out the radioactivity assay (see, for example, Anal. Chem. 35 (1963) (1579)). This procedure may lead to loss of accuracy as the splitting ratio can be influenced by changes in gas compositon. Moreover, part of the radioactive material does not pass the radioactivity detector resulting in loss of sensitivity.

It has now been found that this drawback can be avoided by the method according to the present invention, which is characterized in that the gaseous effluent from the chromatograph column is entirely passed through the flame ionization detector, the escaping oxidation products being collected and analyzed in a radioactivity detector.

The method according to the invention makes it possible, in the combined gas chromatography and radioactivity analysis of very small samples, to utilize the extremely high sensitivity of the flame ionization detector, without radioactive components being lost, with consequential decrease in accuracy and/or sensitivity, as a result of a division of the effluent for the radiation detection.

Often the radioactivity of a limited quantity of material to be analyzed will be very low. For the assay of very low activities, the use of a scintillation detector is most suitable, from the point of view of assay technique. However, the use of scintillation detectors for measuring the activity of gaseous components has hitherto only been possible, in many cases, with complicated processing of the sample.

In the method according to the invention, this difficulty can be solved in a very simple manner by collecting the radioactive component(s) present in the oxidation products in a small volume of one or more sorbents, and assaying the radioactvity of the concentrate(s) thus obtained by means of a scintillation detector.

Absorption of the original components of the mixture in a liquid, for radioactvity assay by means of a scintillation detector, is known per se, but has the disadvantages that many substances adversely affect the light output of the scintillator, and the absorption in the solution. This would lead to changes in the response of the radioactivity detector for different fractions from the gas chromatography (see, for instance, Int. J. Appl. Rad. Isotopes 15 (1964) 69–87). In the method according to the the present invention, these drawbacks are not encountered, since the activity is measured not of the radioactive components of the starting mixture, but of their combustion products, which do not adversely affect light output and light absorption.

When absorption in a liquid is applied, it is preferable to use a heterogeneous scintillation detector (see, for example Anal. Bioch. 3 (1962) 68).

Broadly, the method according to the invention is applicable for counting 14C and 3H in organic substances, and may also be applied to compounds comprising other radioactive isotopes, such as sulphur, phosphorus and the halogens. Thanks to the concentration method, which is a preferred embodiment of the present method, and in which the oxidized components of the gas chromatographic analysis can be separately collected in sorbents, the radioactivity assay may be performed continuously or discontinuously. In this connection an optimum counting time may be selected. The result is that, even with a very low activity of the fractions obtained, the radioactivity measurements is extremely accurate. Complicated chemical processing is not necessary, and conventional counting and registration equipment may be used.

The invention comprises within its scope an apparatus for carrying out the method, said apparatus comprising a combustion device and a mass detector adapted to be connected, on the one hand, to a gas chromatographic device, and, on the other hand, to a radioactivity detector, and is characterized in that the said combustion device and said mass detector are combined into a flame ionization detector, which is so constructed that the combustion gases can be collected, and includes combustion gas outlet means adapted to be connected to said radioactivity detector.

In a preferred embodiment of the apparatus according to the invention a sorption zone is interposed between the combustion gas outlet means of the flame ionization detector and the radioactivity detector, the latter being preferably a scintillation detector.

A preferred embodiment of the apparatus of the invention is illustrated diagrammatically in the accompanying drawings, in which FIG. 1 and FIG. 2 show systems adapted for discontinuous and continuous assay of the radioactivity, respectively.

Referring to the drawings, in both figures a carrier gas is supplied through a conduit 1, into which a sample of the mixture to be analyzed is introduced by means of a sample feed system 2. This sample is separated into its components in a gas chromatographic column 3. The component fractions coming from the column 3 are combusted and measured in a flame ionization detector 4. The detector 4 is fed with hydrogen, supplied through conduit 5, and with combustion air or oxygen, supplied through conduit 6. The flame ionization detector 4 is so constructed that the combustion gases can be collected. Through conduit 8, the combustion gases are passed to a sorption zone. The sorption zone 9 comprises a sorbent capable of binding the radioactive component(s) present in the effluent from the detector 4. The sorbent may be solid or liquid, and it is also possible to use two or more sorbents, if required or desirable for complete sorption of the radioactive components. The unsorbed gases leave the sorption zone through conduit 10, and the sorbent with the radioactive components concentrated therein is passed through a conduit 11 to a radioactivity detector 12, which is preferably a scintillation detector, from which it is removed through conduit 13.

In FIG. 1, the drawn lines represent continuous currents, and the dash-dot lines represent batchwise transports. It will be understood that in the discontinuous embodiment the radioactive components of the effluent from the detector 4 may be collected in the sorption zone 9 fraction wise, the connection 11 to the scintillation detector 12 being closed until the radioactive components of a fraction have been fully sorbed in the zone 9. The sorbent is then withdrawn to the scintillation detector 12, where it is analyzed as to radioactivity for a suitable period of time.

In the continuous system of FIG. 2, a sorbent is passed continuously into the sorption zone 9 throught conduit 14. The sorbent, preferably a liquid, absorbs the radioactive components of the combustion gases coming from the flame ionization detector 4 during the contact between the gases and the liquid effected in the zone 9. The liquid with the absorbed radioactive components is continuously passed into the scintillation detector 12 through conduit 11, for continuous measurement of the radioactivity.

The embodiment of FIG. 1 is particularly suitable for the radio gas chromatographic analysis of very small quantities of material of very low radioactivity, while the embodiment of FIG. 2 is suitable for very small quantities of material of a higher activity.

The apparatus according to the invention is preferably so constructed that the embodiments of FIG. 1 and FIG. 2 can both be realized in it, so that a general purpose apparatus is obtained.

Example

A gaseous mixture of compounds labelled with 14C and 3H is separated in a gas chromatographic column, whereafter the gases are combusted in a specially constructed flame ionization detector, and measured by means of this detector. The combustion gases, which comprises carrier gas, air or oxygen, $CO_2$, $14CO_2$, $H_2O$ and $3H_2O$, are passed into a microabsorption device, in which the labelled products are absorbed by a small quantity of a liquid absorbent.

In the discontinuous embodiment, the separated fractions are absorbed in a few cc., e.g., 1 to 2 cc. of liquid. The liquid is transferred to the tubes of a fraction collector, which is automatically controlled by the signal of the flame ionization detector in such a manner that each tube contains the 14C and the 3H of one fraction separated in the gas chromatograph. The counting is effected by means of a heterogeneous scintillation detector consisting of a cell packed with anthracene crystals interposed between two photomultiplier tubes (see Anal. Bioch. 3 (1962) 68–74). The liquids to be counted may be automatically transferred from the fraction collector to the cell, whereafter the counting may be effected on a pre-set time or pre-set count basis.

In the continuous embodiment, the combustion gas fractions may be directly passed through a cell packed with anthracene crystals, or first be absorbed in a continuous stream of a suitable absorption liquid.

I claim:

1. A method for the radio gas chromatographic analysis of a mixture of different components comprising steps of passing the effluent from a gas chromatographic column through a flame ionization detector to measure the concentration of components in the gas mixture, oxidizing the gaseous effluent while in the flame ionization detector to form oxidation products thereof, collecting the oxidation products from the ionization flame detector, and radioactively analyzing the said oxidation products.

2. A method as defined in claim 1 in which a radioactive component present in the oxidation products is collected in a small volume of a sorbent to obtain a concentrate thereof and the concentrate thus obtained is analyzed with a scintillation detector.

3. A method as defined in claim 2 in which the sorbent is a liquid and radioactivity is measured with a heterogeneous scintillation detector.

4. A method as claimed in claim 3 in which the gas components after being absorbed in the sorbent are separated into fractions and transferred to a fraction collector which is automatically controlled by a signal from the flame ionization detector whereby each fraction contains desired components.

5. Apparatus for the radio gas chromatographic analysis of a mixture of components comprising a gas chromatographic device, means to supply a gas mixture to said gas chromatographic device, a flame ionization detector connected to the output of said gas chromatographic device for measuring the concentration of components in the gas mixture, said flame ionization detector including means to combust the gas mixture and form oxidation products thereof which can be collected, a radioactivity detector for radioactively analyzing the oxidation products obtained from said flame ionization detector, and means to collect and transfer the oxidation products from said ionization flame detector to said radioactivity detector.

6. Apparatus as claimed in claim 5 in which said means to collect and transfer the oxidation products includes a sorption zone where said products are absorbed in a sorbent.

7. Apparatus as claimed in claim 6 is a scintillation detector.

8. Apparatus as claimed in claim 7 in which the scintillation detector is a heterogeneous scintillation detector.

9. Apparatus as claimed in claim 8 in which the scintillation detector comprises a cell containing anthracene crystals interposed between a pair of photomultiplier tubes.

10. Apparatus as claimed in claim 9 in which the sorption zone includes means to separate the absorbed oxidation products into fractions.

11. Apparatus as claimed in claim 10 in which the fraction separating means includes means responsive to a signal from the ionization flame detector for controlling the components of each fraction.

References Cited

Karmen et al.: Analytical Chemistry, vol. 35, No. 4, April 1963, pp. 536—541.

James et al.: Analytical Chemistry, vol. 35, No. 4, April 1963, pp. 515–520.

RICHARD C. QUEISSER, *Primary Examiner.*

C. I. McCLELLAND, *Assistant Examiner.*

U.S. Cl. X.R.

324—140; 328—144